United States Patent
Perry et al.

(10) Patent No.: US 11,984,799 B2
(45) Date of Patent: May 14, 2024

(54) DUAL-PATH ACTIVE DAMPER FOR A RESONANT NETWORK

(71) Applicant: Raytheon Company, Tewksbury, MA (US)

(72) Inventors: Marty Perry, Tucson, AZ (US); Robert J. Schaller, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 23 days.

(21) Appl. No.: 17/572,607

(22) Filed: Jan. 10, 2022

(65) Prior Publication Data

US 2023/0188029 A1    Jun. 15, 2023

Related U.S. Application Data

(60) Provisional application No. 63/289,874, filed on Dec. 15, 2021.

(51) Int. Cl.
  *H02M 1/15*   (2006.01)
  *H02M 1/34*   (2007.01)
  *H02M 3/158*  (2006.01)

(52) U.S. Cl.
  CPC ............ *H02M 1/15* (2013.01); *H02M 1/344* (2021.05); *H02M 3/158* (2013.01)

(58) Field of Classification Search
  CPC .................................................. H02M 1/344
  See application file for complete search history.

(56) References Cited

U.S. PATENT DOCUMENTS

| | | | |
|---|---|---|---|
| 6,188,592 B1 | 2/2001 | Farrington et al. | |
| 6,236,191 B1 | 5/2001 | Chaffai | |
| 9,667,132 B2* | 5/2017 | Ghosh | H02M 3/33507 |
| 2006/0215424 A1 | 9/2006 | Aso et al. | |

FOREIGN PATENT DOCUMENTS

| | | |
|---|---|---|
| EP | 3553928 A1 | 10/2019 |
| TW | 202327237 A | 7/2023 |
| WO | WO-2023114291 A1 | 6/2023 |

OTHER PUBLICATIONS

"Snubber Circuit for Buck Converter IC", Rohm Semiconductor, Application Note, (Oct. 2016), 6 pgs.
"International Application Serial No. PCT/US2022/052836, International Search Report dated Mar. 27, 2023", 5 pgs.

(Continued)

*Primary Examiner* — Peter M Novak
(74) *Attorney, Agent, or Firm* — Schwegman Lundberg & Woessner, P.A.

(57) ABSTRACT

A dual-path active damper reduces power losses while damping ringing waveforms in resonant circuits. One path clamps the peak value of a node voltage at less than a rated voltage of a protected device while allowing the node voltage to ring and decay naturally. Another path waits for some delay after the peak value is clamped until closing an active switch to draw a reset current through an RC snubber to actively dampen the ringing of the node voltage. The delay and on-time of the active switch are set to reduce or even minimize power losses for damping the ringing waveform within a specified period.

20 Claims, 16 Drawing Sheets

(56) References Cited

OTHER PUBLICATIONS

"International Application Serial No. PCT/US2022/052836, Written Opinion dated Mar. 27, 2023", 7 pgs.

Jennifer, Bauman, et al., "A Novel Capacitor-Switched Regenerative Snubber for DC/DC Boost Converters", IEEE Transactions on Industrial Electronics, IEEE Service Center, Piscataway, NJ, USA, vol. 58, No. 2, (Feb. 1, 2011), 10 pgs.

Nan, Chenhao, et al., "A 2.2-MHz Active-Clamp Buck Converter for Automotive Applications", IEEE Transactions on Power Electronics, Institute of Electrical and Electronics Engineers, USA, vol. 33, No. 1, (Jan. 1, 2018), 13 pgs.

Yu, Zuoliang, et al., "Design of a Novel GaN-Based 4-MHz ZVS Active-Clamping Synchronous Buck Converter", 2020 IEEE 9th International Power Electronics and Motion Control Conference (IPEMC2020-ECCE Asia), IEEE, (Nov. 29, 2020), 6 pgs.

Yungtaek, Jang, et al., "Soft-switched high-power-factor boost converter", Telecommunications Energy Conference, 2004. INTELEC 2004. 26th Annual International Chicago, IL, USA Sep. 19-23, 2004, Piscataway, NJ, USA,IEEE,, (Sep. 19, 2004), 7 pgs.

"Taiwanese Application Serial No. 111147832, Office Action dated Oct. 6, 2023", W/English Translation, 12 pgs.

Jang, Yungtaek, et al., "High-Power-Factor Soft-Switched Boost Converter", IEEE Transactions on Power Electronics vol. 21, No. 1, (Jan. 2006), 98-104.

"Taiwanese Application Serial No. 111147832, Response filed Jan. 9, 2024 to Office Action mailed Oct. 6, 2023", w current English claims, 28 pgs.

\* cited by examiner

DUAL-PATH ACTIVE DAMPER FOR A RESONANT NETWORK

CROSS-REFERENCE TO RELATED APPLICATIONS

This application claims benefit of priority under 35 U.S.C. 119(e) to U.S. Provisional Application No. 63/289,874 entitled "Dual-Path Active Damper for a Resonant Network" and filed on Dec. 15, 2021, the entire contents of which are incorporated by reference.

BACKGROUND OF THE INVENTION

Field of the Invention

This invention relates to damping of resonant circuits, and more particularly to a dual-path active damper that reduces power loss while damping ringing waveforms.

Description of the Related Art

Power conversion electronics contain circuits that can abruptly change states resulting in fast changing voltage waveforms. This is especially prevalent in modern power converters employing high speed switching elements based on MOSFET, SiC and GaN semiconductors. High rate of change voltages may excite resonant circuits inherent in interconnects of circuit elements resulting in ringing waveforms. These ringing waveforms can result in over voltage stress of circuit components, excessive electromagnetic interference (EMI) and corruption of measurements critical to operation of the power converter.

FIGS. 1A and 1B show a resonant circuit 100 (e.g. parallel-connected parasitic inductance Lr and parasitic resistance Rr series-connected with parasitic capacitance Cr) driven by a fast rising voltage waveform (e.g., forcing function Vs) with arbitrary damping. When forcing function Vs 102 transitions from low to high, the node voltage Vr 104 has a resulting resonant response where the peak amplitude of Vr is twice that of Vs and has a resonant frequency of:

$$Fr = \frac{1}{2*\pi*\sqrt{Lr*Cr}} \quad (1)$$

A DC-DC switching power converter (SPC) has an energy storage section, a switching control circuit such as a pulse width modulator (PWM), a primary switch, and a rectifier. The energy storage section is responsive to the selective application of the DC input voltage to produce a current and the regulated DC output voltage. The switching control circuit, primary switch and rectifier control the application of the DC input voltage to the energy storage section to set the value of the regulated DC output voltage. The "Buck", "Boost" and "Buck/Boost" are base SPC topologies, which can be isolated to provide "Flyback" and "Forward" topologies. These can be single or double-ended and single or double magnetic core.

As shown in FIGS. 2A-2C, a buck converter 200 includes a DC voltage source 202, an energy storage section 204 including inductor L1 and capacitor C1, a switching circuit 206 including switches S1 and S2 and a switching control circuit (not shown) that controls the switches. Switches S1 and S2 switch in opposition to produce a square wave forcing function at node 209 from the DC voltage source. The square wave is filtered by elements L1 and C1 to produce a DC output voltage Vout. The conversion function is related to the duty cycle of S1 (D) multiplied by the source voltage Vg to yield:

$$Vout=Vg*D \quad (2)$$

In a practical implementation the loop area of the switching circuit is non-zero and develops a parasitic inductance Lr. Additionally, a parasitic capacitance Cr exists due to the layout of the circuit elements and the output capacitance (Coss) of switches S1 and S2. When S2 opens and S1 immediately closes a voltage step 207 at Vg appears across Lr resulting in a node voltage Vr 208 at node 209 that rings. The ringing frequency in a well-designed converter is well above the operating frequency of the power converter and could be on the order of 30-50 MHz.

The node voltage Vr rings to two times the applied DC input voltage Vg. Thus the switches S1 and S1 must have a voltage rating (Vrated) to reliably withstand this applied voltage stress. Semiconductor switches in general have higher resistive losses with higher voltage ratings thus it is desirable to use the switch with the lowest possible voltage rating for the application to realize the lowest losses and cost. Additionally, the ringing waveform will produce undesirable high frequency EMI. Ringing in the power converter can also disrupt controlled operation. For example, if one was to control the inductor current L1 through a sensing means (not shown) the sensing will be negatively impacted by ringing during the time S1 is on (D state) unless the dampening of the ringing waveform is performed.

A snubbing element may be introduced to dampen a resonant circuit. The snubbing element inserts a loss element in such a way as to convert the stored energy in the resonant elements into heat. As shown in FIG. 3, a buck converter 300 of the type shown FIG. 2 is provided with a simple snubbing element 302 made up of resistor-Rsnub and capacitor Csnub typically referred to as an "RC snubber." Csnub AC couples resistor Rsnub in parallel with the resonant voltage node to prevent DC losses. In practice Csnub will be much larger than Cr (generally 2 to 10 times) and Rsnub is typically set equal to the characteristic impedance of the resonant circuit:

$$Rsnub \approx \sqrt{\frac{Lr}{Cr}} \quad (3)$$

The operation of the RC snubber forces the capacitor—Csnub—to be charged and discharged each switching cycle thus the power loss of the snubber resistor in this circuit to a first order is simply:

$$PRsnub=Csnub*Vg^2 \quad (4)$$

While effective in snubbing the ringing of node voltage Vr 304 at node 306 in the resonant circuit, the simple RC snubber offers limited design modification options and can result in significant loss since the loss equation is based on the square of the applied voltage Vg.

Active snubbing techniques can counteract some of the limitations of simple RC snubbing by introducing an active switch timed such that the RC snubber is applied to the resonant circuit in a controlled fashion. As shown in FIGS. 4A-4C, a buck converter 400 similar to FIG. 2 is provided with an active snubber 402. Active snubber 402 includes an active switch S3 404 inserted in series with an RC snubber 406 (e.g. series-connected Rsnub and Csnub) to form an active clamping function. Switch S3 is closed immediately after S1 is closed producing node voltage Vr 408 at node 410 and S3 is opened at some time before S1 is opened. The switch pattern prevents the complete discharge of Csnub and thus the energy in the snubber is reduced to the delta voltage of the snubber capacitor (e.g., Vr–Vg). Since the loss is related to the square of the voltage the losses in the active snubber can be significantly reduced as compared to the simple RC snubber.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a dual-path active damper that reduces power losses while damping ringing waveforms in resonant circuits. One path clamps the peak value of a node voltage at less than a rated voltage of a protected device while allowing the node voltage to ring and decay naturally. Another path waits for some period after the peak value is clamped until closing an active switch to draw a reset current through an RC snubber to actively dampen the ringing of the node voltage. The delay and on-time of the active switch are set to reduce or even minimize power losses for damping the ringing waveform within a specified period.

In an embodiment, a dual-path active damper includes a common snubber capacitor Csnub coupled to the node, a clamping path including Csnub, a diode and a clamp voltage and a damping path including series-connected Csnub and a snubber resistor Rsnub and an active switch. At each positive state change of a forcing function applied to the resonant network, a node voltage Vr increases from a steady-state value Vss until surpassing Vr+Vclamp at which point the diode in the clamping path conducts Iclamp to clamp the peak voltage of node voltage Vr at Vss+Vclamp (<Vrated). After a delay from each positive state change, the active switch closes such that the damping path conducts a reset current Ireset through an RC snubber to dampen the ringing of node voltage Vr. The delay and closing of the active switch occur after the clamping of the peak value of the node voltage and remains closed for at least a minimum reset period of the RC snubber.

In different embodiments, the active switch opens prior to or remains closed to overlap the next negative state change of the forcing function.

In different embodiments, the "on-time" (closed period) of the active switch may be fixed or variable. If variable, the on-time may be responsive to changes in the forcing function.

In an embodiment, the damping path further includes a diode. The damping path conducts the reset current through series-connected RC snubber and the diode only on negative excursions of the diode.

In an embodiment, a switched power supply (SPC) supplies the forcing function and defines the resonant network. The protected device is typically a switch in the SPC.

In an embodiment, a system includes multiple different resonant networks or nodes at which a waveform must be dampened to protect different devices.

These and other features and advantages of the invention will be apparent to those skilled in the art from the following detailed description of preferred embodiments, taken together with the accompanying drawings, in which:

DETAILED DESCRIPTION OF THE INVENTION

While the active snubber offers improvement in losses as compared to the passive RC snubber it does not offer the ability to optimize the loss while providing peak voltage clamping capability. In particular, it may be desirable to have an active damping function that allows ringing of node voltage Vr for a set interval as long as the peak voltage is clamped to a particular level to optimize performance of the converter before damping node voltage Vr. However, given the switch control and topology of the active snubber, the losses in the snubber vs. voltage excursion of Vr cannot be independently controlled. Switch S3 can be opened or closed. Thus, losses in the snubber configuration must come at the expense of control of the peak voltage of Vr.

Figure 5:
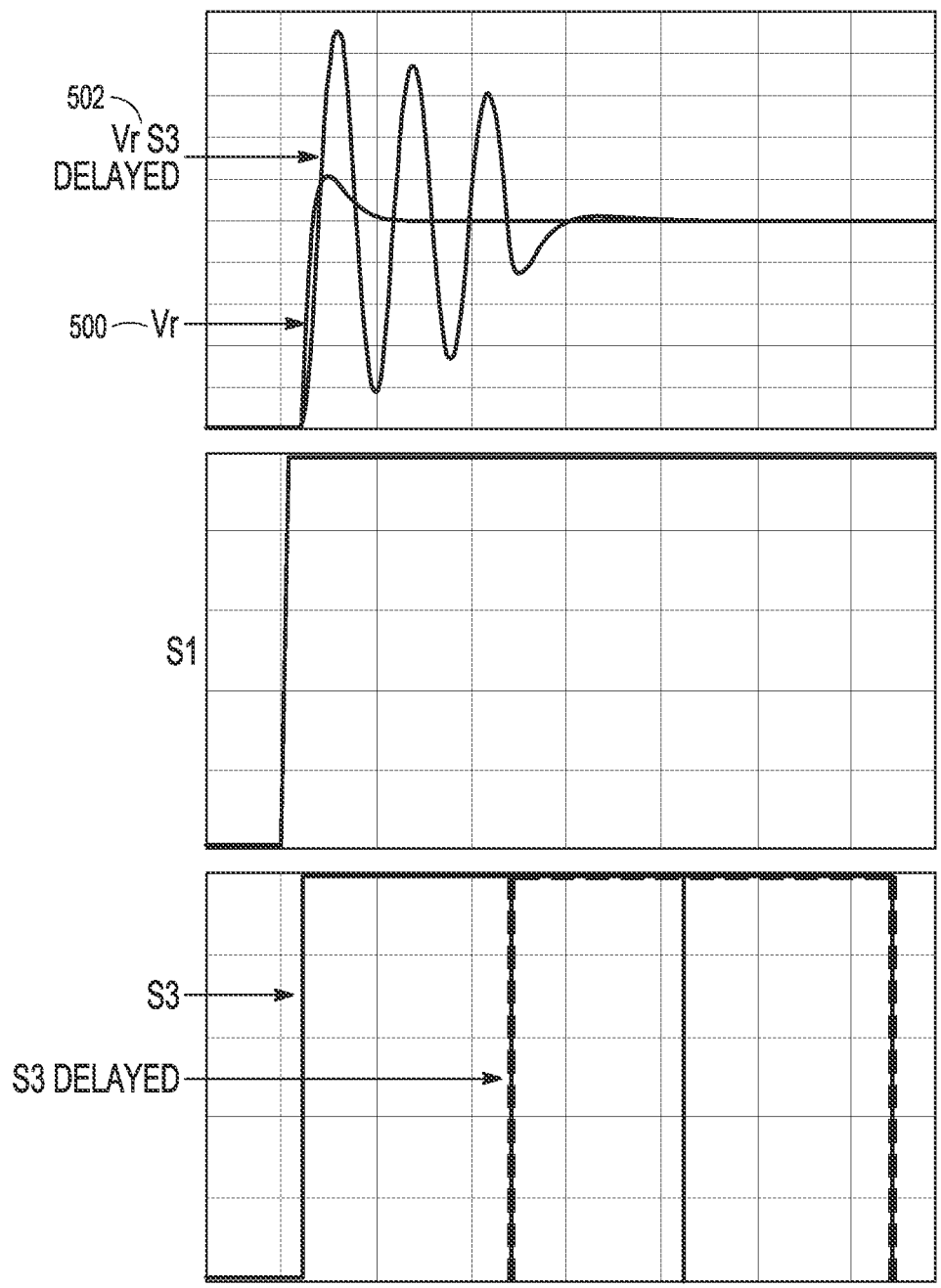
FIG. 5 illustrates a pair of switching patterns for an active RC snubber in which in one case the active switch is closed immediately to dampen the node voltage and in another case the active switch is delayed to allow the node voltage to ring before damping to reduce power loss.

As shown in FIG. 5, closing active switch S3 in the active snubber immediately after closing S1 produces a node voltage Vr 500 that is quickly dampened. If the closing of active switch S3 is delayed, the node voltage Vr 502 is allowed to ring, which minimizes losses. However, the peak value of node voltage Vr climbs to twice the applied DC input voltage. There exists a need for an active snubber that provides controlled damping action with independent control of the peak voltage of the resonant circuit.

In accordance with the present invention, a dual-path active damper reduces power losses while damping ringing waveforms in resonant circuits. One path clamps the peak value of a node voltage at less than a rated voltage of a protected device while allowing the node voltage to ring and decay naturally. Another path waits for some delay after the peak value is clamped until closing an active switch to draw a reset current through an RC snubber to actively dampen the ringing of the node voltage. Using different voltages for clamping and damping allows for a significant decrease in snubber power losses. The delay and on-time of the active switch are set to reduce or even minimize power losses for damping the ringing waveform within a specified period.

Figure 6A:
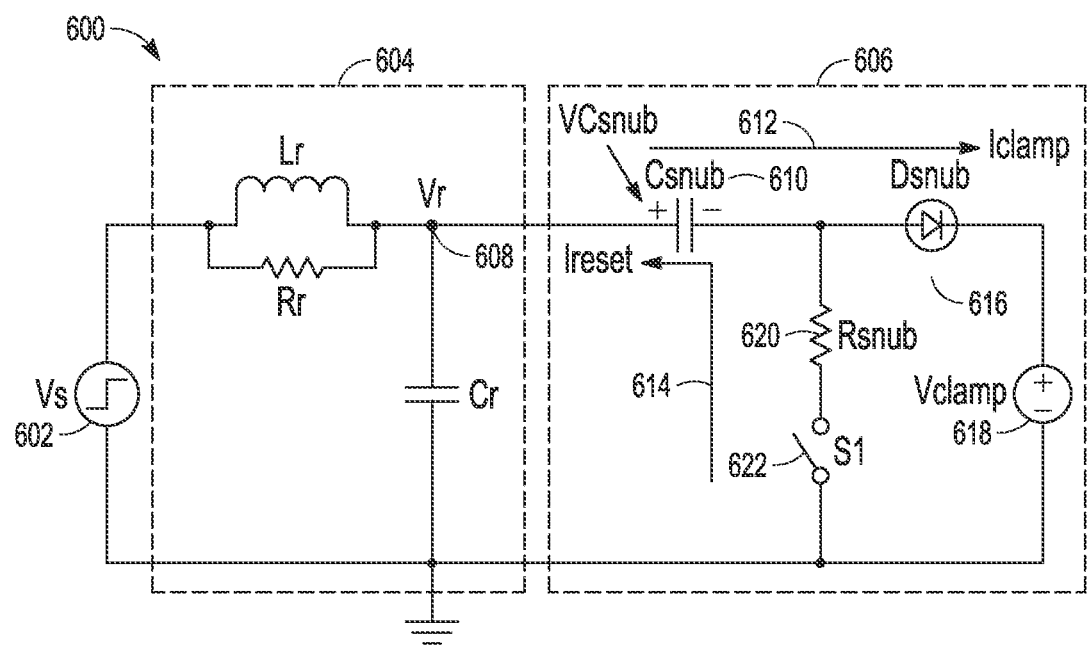
FIGS. 6A and 6B illustrate an embodiment of a resonant circuit with a dual-path active damper that immediately clamps the peak node voltage and allows the node voltage to ring before activating the RC snubber to minimize power loss.
Figure 6B:
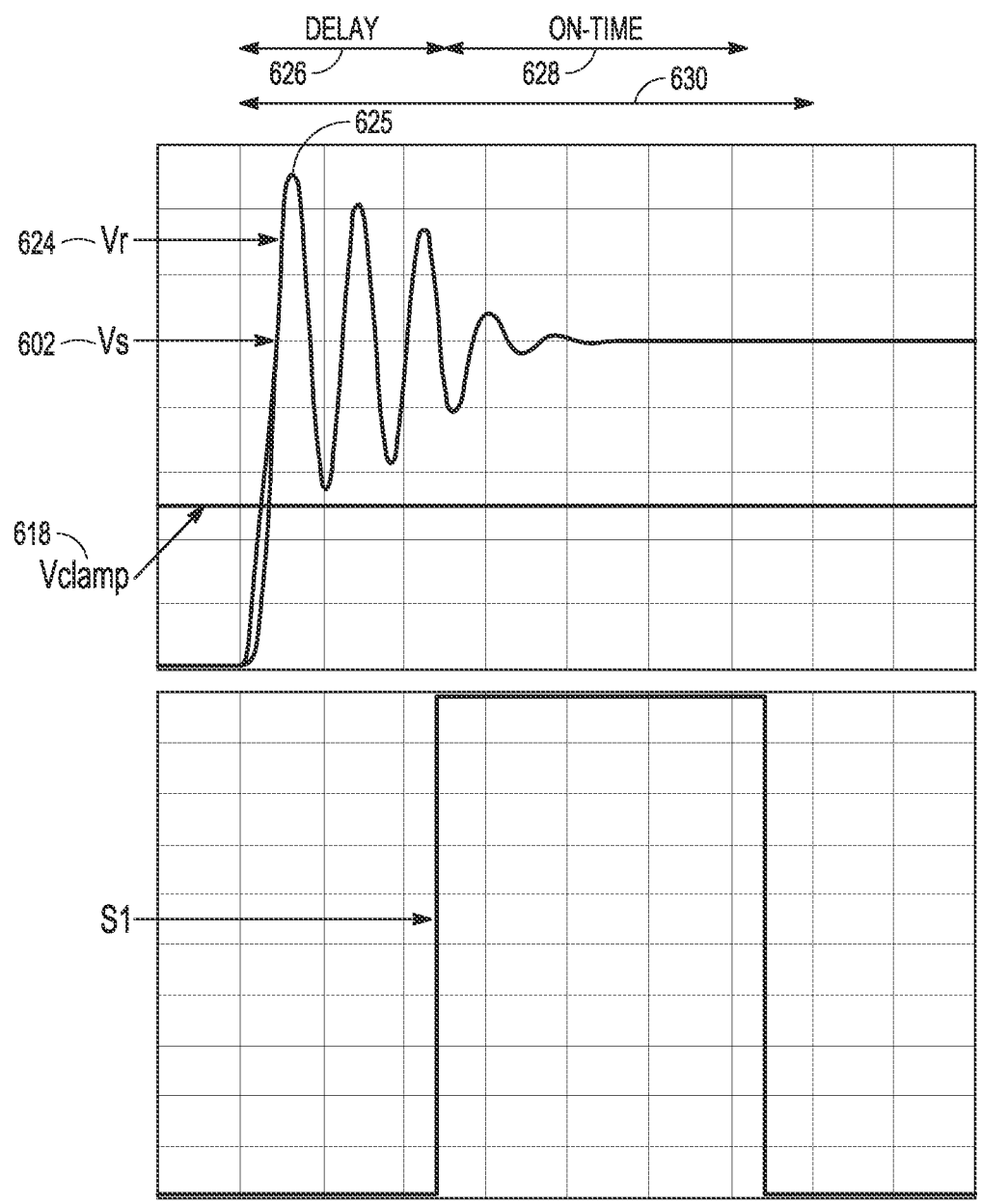

As shown in FIGS. 6A and 6B, a dampened resonant circuit 600 includes a source of a forcing function Vs 602, a resonant circuit 604 and a dual-path active damper 606 coupled to a node 608 of the resonant circuit 604. Source 602 may be any source that abruptly change states resulting in fast changing voltage waveforms. Any one of the SPC topologies may be used. Resonant circuit 604 may be a standalone circuit or a circuit and node within the source, e.g., any type of SPC. There may be multiple nodes at which the waveform rings and must be dampened. One option is to strategically place the dual-path active damper 606 to dampen a node and thereby dampen other downstream nodes. Alternately, multiple dual-path active dampers 606 can be coupled to different nodes and resonant circuits.

In most resonant circuits, only a positive state change of the forcing function (e.g. from low to high voltage) produces a ringing waveform that must be dampened. Typically, a negative state change is switching the node to a negative rail such as ground potential or 0 Volts where its clamped at 0 Volts.

Dual-path active damper 606 includes a common snubber capacitor Csnub 610 coupled to node 608, a clamping path 612 and a damping path 614 both of which include the common snubber capacitor Csnub 610. Clamping path 612 includes in-series Csnub 610, a snubber diode Dsnub 616 and a clamp voltage Vclamp 618. Csnub is roughly 10× the parasitic capacitance but sized to maintain the peak voltage and minimize power dissipation. Vclamp can be a specific selected voltage or a convenient voltage in the design. For example Vclamp could be the output voltage of the power converter or an internal or external bias rail. Damping path 614 includes in series Csnub 610 and Rsnub 620, which form an RC snubber, and an active switch S1 622. Rsnub is suitably set equal to the characteristic impedance of the resonant network such that the time constant of the RC snubber is maybe 5 to 10 times the period of the resonant network and the ring is completely damped within 1 to 2 cycles. Optionally, damping path 614 may include a diode whereby damping only occurs on negative excursions of the node voltage Vr with respect to the steady-state value. Damping takes longer but losses are reduced.

At each positive state change of forcing function Vs, node voltage Vr 624 increases from a steady-state value Vss (e.g., switched DC value of Vs) until it surpasses Vr+Vclamp at which point diode 616 is forward biased and conducts a clamp current Iclamp that clamps the peak voltage 625 of node voltage Vr at Vss+Vclamp. Depending on the natural dampening properties of Vr as it rings, the peak may be clamped only once or multiple times until it decays to less than Vss+Vclamp at which point the clamping path turns itself off. Vss+Vclamp<Vrated for the protected device. Reducing Vclamp allows for the use of lower voltage rated, and thus less lossy, devices. The selection of Vclamp is a trade-off between protecting the device and minimizing losses.

After a time delay 626 from each positive state change, active switch S1 622 is closed to conduct a reset current Ireset to dampen the ringing of node voltage Vr 624. The time delay is at least past the peak 625 or approximately ¼ cycle of the resonant circuit. For example, the time delay may be two to four cycles of the resonant circuit. The delay may be "fixed" or "variable", based on changes in the forcing function to minimize losses. Changes in the forcing function may, for example, be driven by changes in a load. The delay and "on-time" (closed period) 628 of the active switch S1 are set to reduce, and preferably minimize power losses subject to node voltage Vr reaching the steady-state value Vss within a specified period 630 from each positive state change. In general, delay as long as possible before damping to minimize losses. The on-time is at least a minimum reset period of the RC snubber. Typically, the specified period ends and active switch S1 is opened prior to the next negative state change of the forcing function. However, in certain cases, the on-time will extend and overlap the next negative state change causing Csnub to discharge. This may occur when the input voltage is abnormally high in order to fully or partially discharge Csnub thus lower the effective peak node voltage on the protected device since Csnub has to be charged each cycle. This will increase losses but the abnormal condition is typically rare and short, thus it can be a good trade off to protect the device until the input voltage returns to its normal value.

Figure 7A:
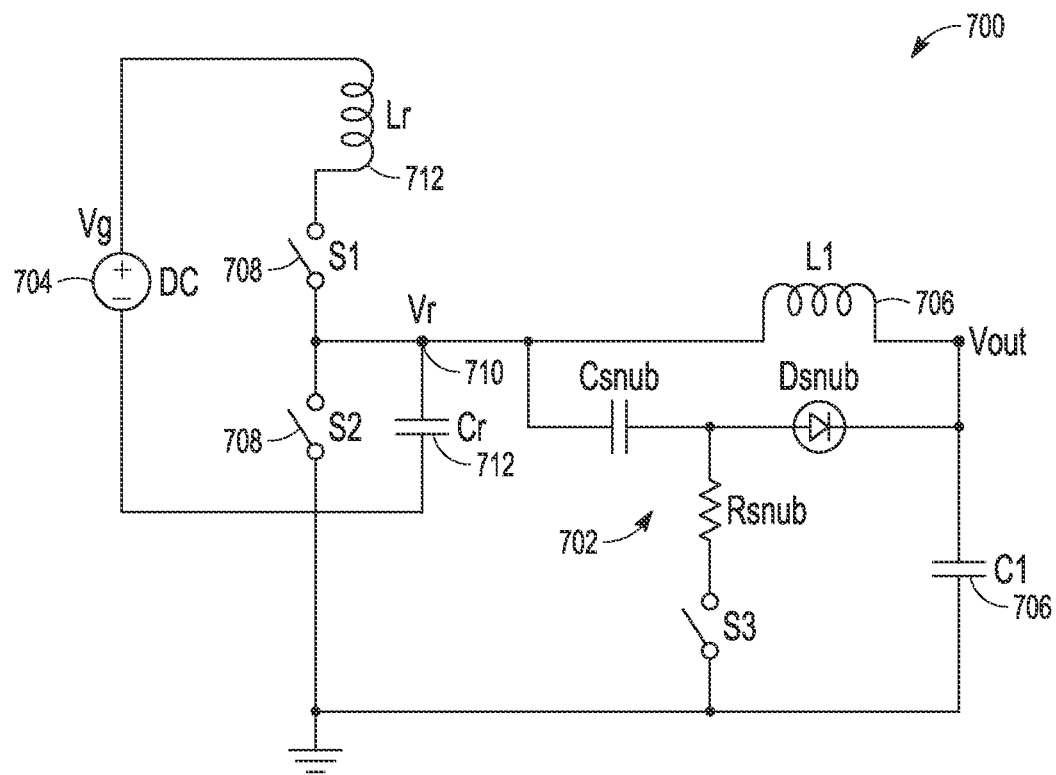
FIGS. 7A and 7B illustrate an embodiment of a Buck converter with a dual-path active damper that immediately clamps the peak node voltage and allows the node voltage to ring before damping to minimize power loss.
Figure 7B:
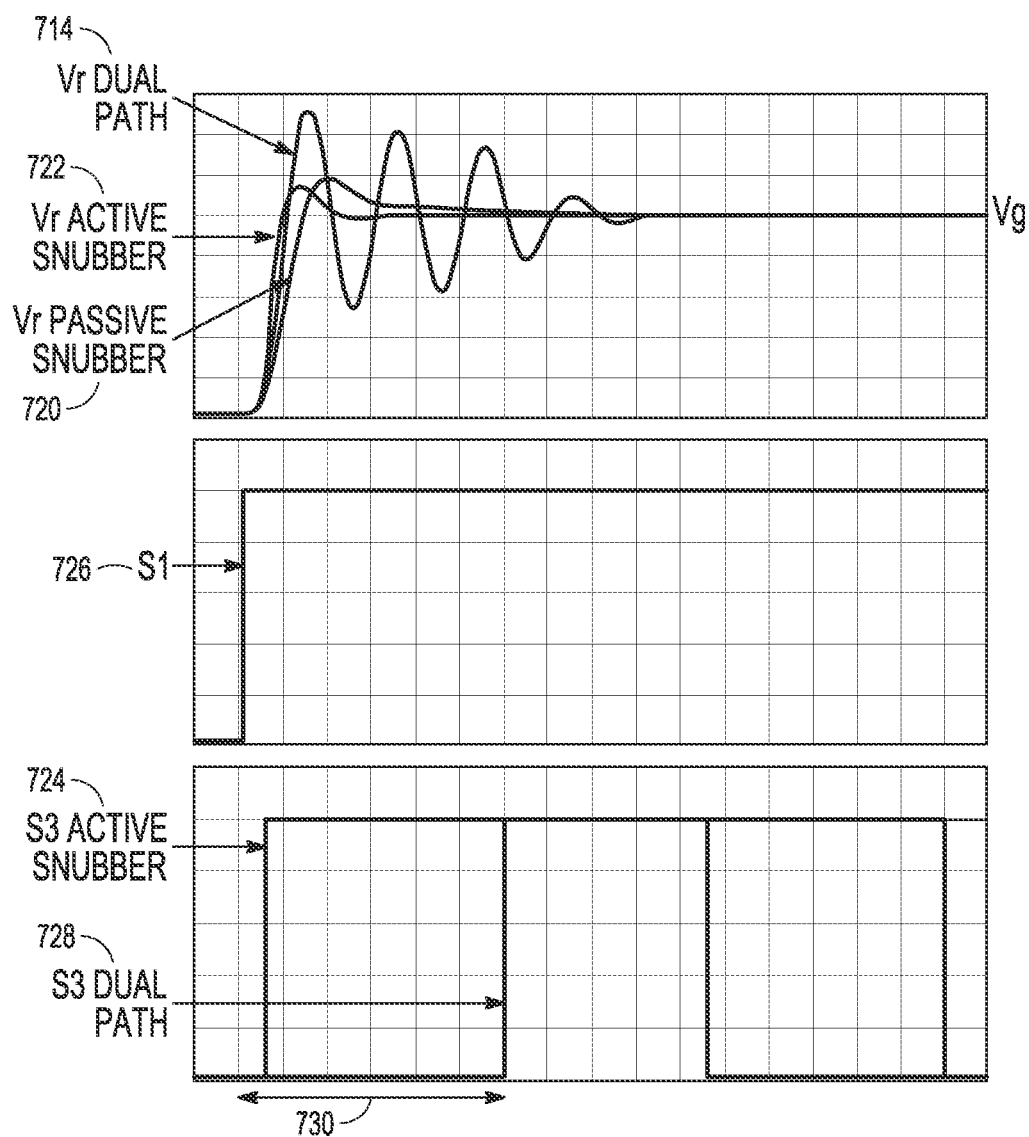

As shown in FIGS. 7A and 7B, a Buck converter 700 is provided with a dual-path active damper 702. Buck converter 700 includes a DC voltage source 704 that supplies voltage Vg, an energy storage section 706 including inductor L1 and capacitor C1 a switching circuit 708 including switches S1 and S2 and a switching control circuit (not shown) that controls the switches. Switches S1 and S2 switch in opposition to produce a square wave forcing function at node 710 from the DC voltage source. The square wave is filtered by elements L1 and C1 to produce a DC output voltage Vout. A parasitic inductance Lr and a parasitic capacitance Cr of the Buck converter define a resonant network 712. When S2 opens and S1 immediately closes a voltage step is produced that generates a node voltage Vr 714 at node 710. If left uncontrolled, the node voltage Vr would ring to two times the applied DC input voltage Vg. Accordingly, switch S2 would require a rating voltage Vrated>2*Vg, which is generally undesirable.

Instead dual-path active damper 702 clamps the peak of Vr to Vg+Vout (where Vclamp is Vout in this embodiment) limiting the peak excursion of Vr and allowing Vr to ring and naturally dampen for about 3 cycles of the forcing function. Active Switch S3 is delayed to achieve the lowest loss damping. Thus the dual-path active damper allows for independent control of damping and peak voltage control minimizing losses and protecting the device (in this case switch S2).

Figure 1A:
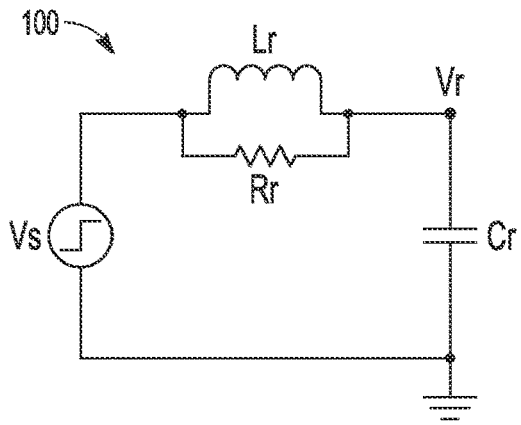
FIGS. 1A and 1B, as described above, illustrate a basic resonant circuit subjected to a forcing function that produces a fast rising voltage with arbitrary damping.
Figure 1B:
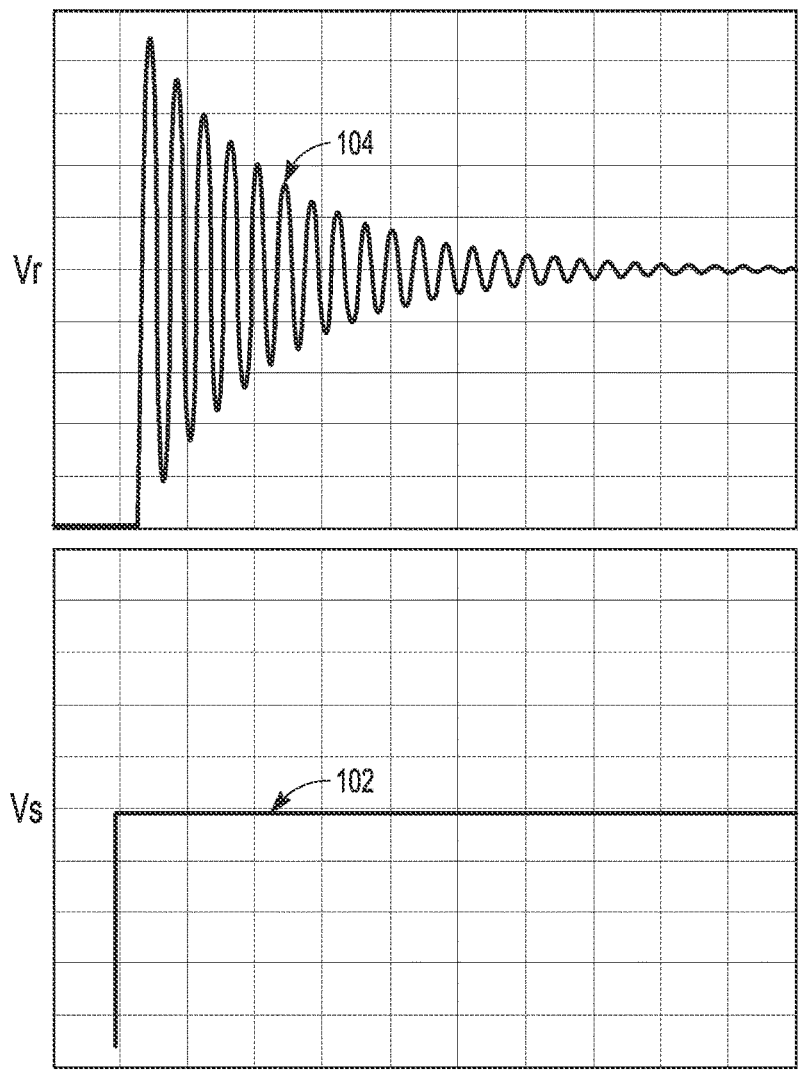
Figure 2A:
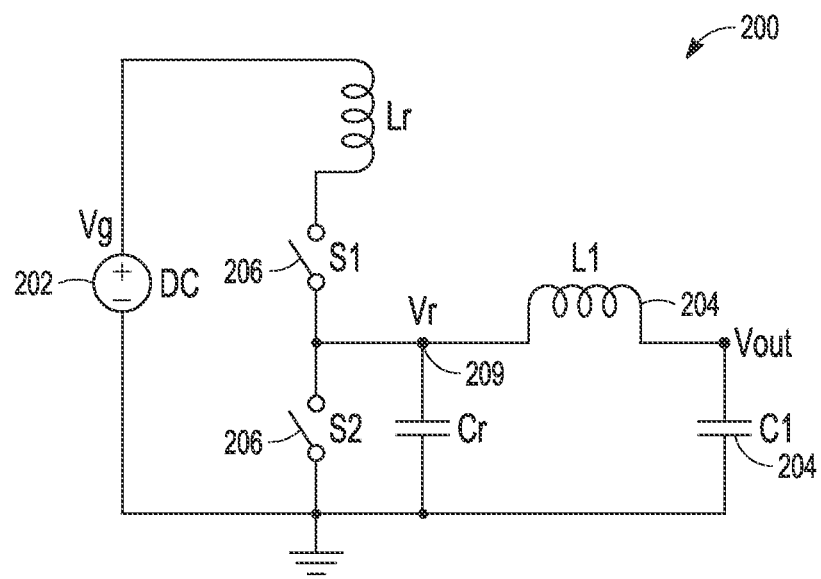
FIGS. 2A through 2C, as described above, illustrate the use of a Buck converter to provide the forcing function and the node voltage that rings and naturally dampens.
Figure 2B:
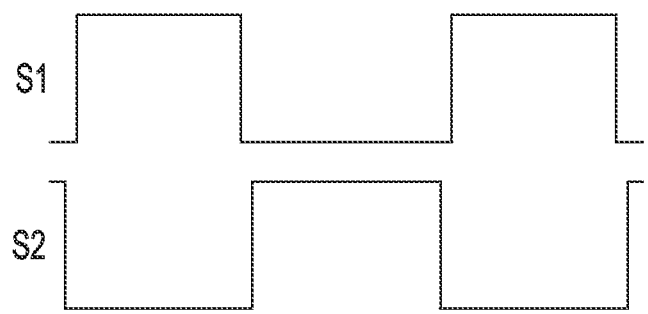
Figure 2C:
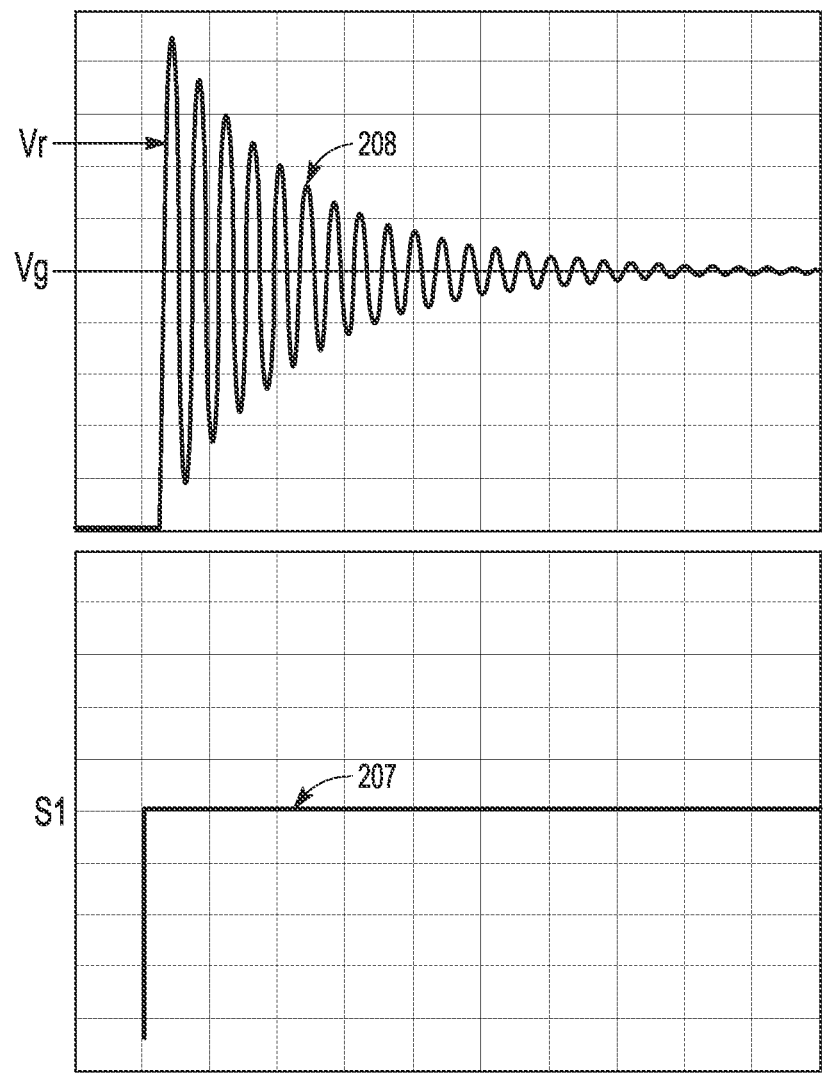
Figure 3A:
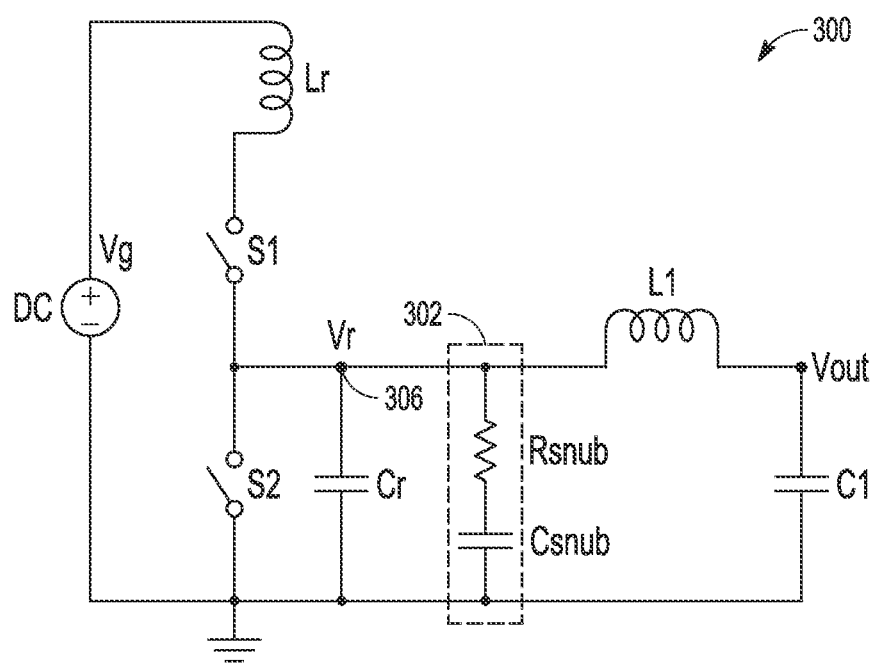
FIGS. 3A and 3B, as described above, illustrate a Buck converter with a passive RC snubber and the dampened node voltage.
Figure 3B:
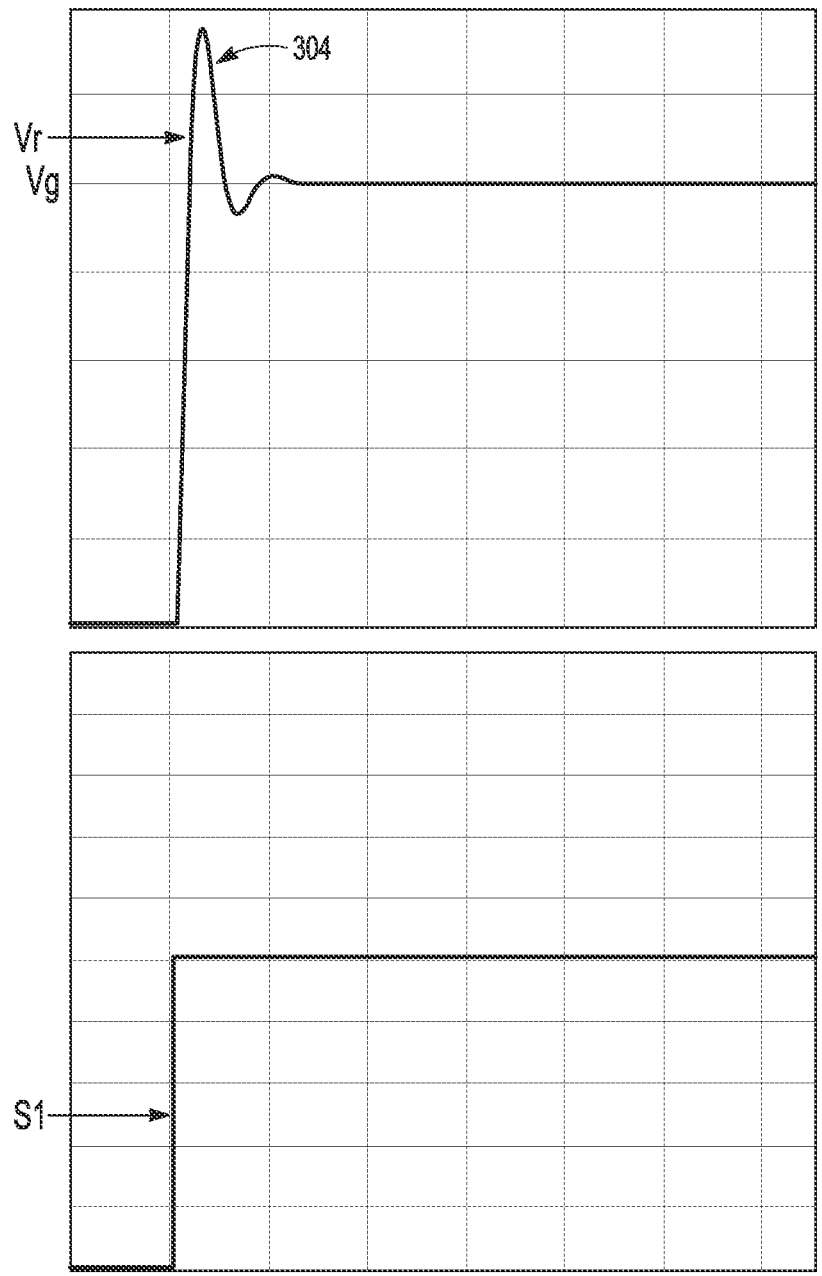
Figure 4A:
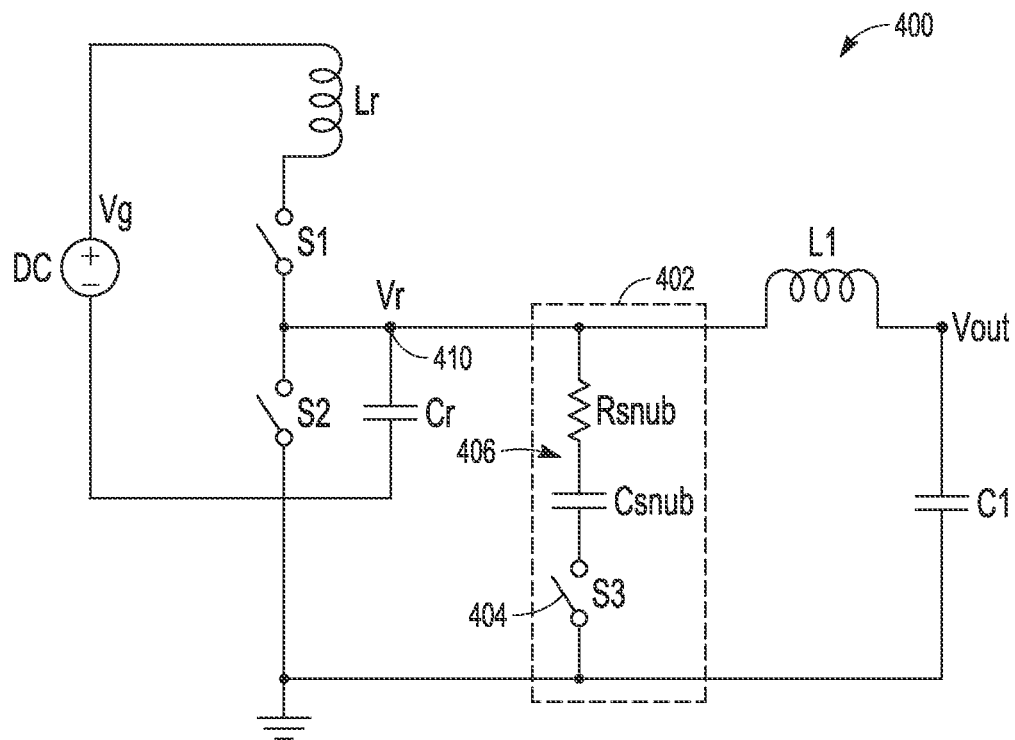
FIGS. 4A through 4C, as described above, illustrate a Buck converter with an active RC snubber and the dampened node voltage.
Figure 4B:
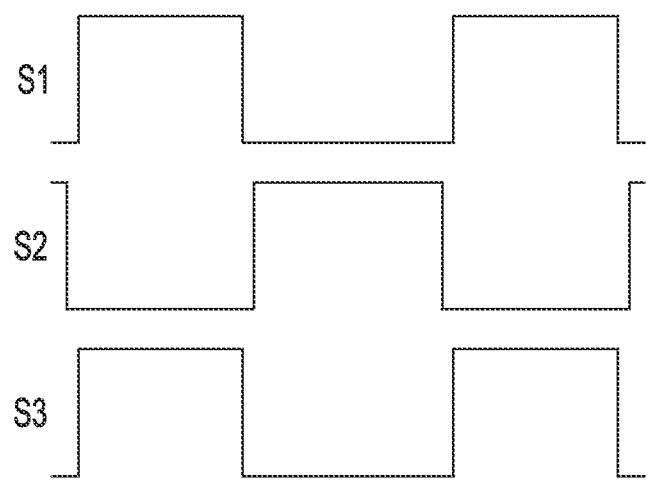
Figure 4C:
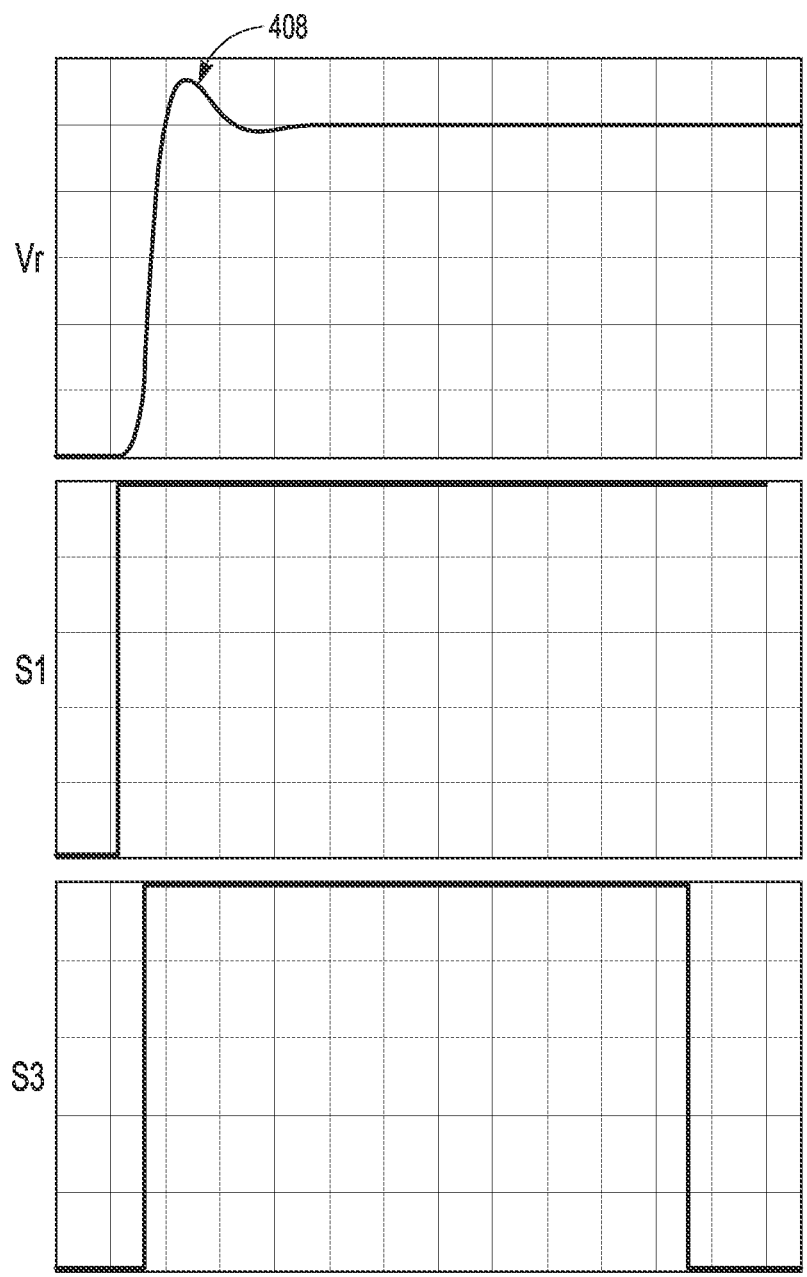

As shown in FIG. 7B, node voltage Vr 714 is clamped at a specified peak value, allowed to ring and then dampened to steady-state value Vss=Vg within a specified period. A node voltage Vr 720 for a passive RC snubber of the type depicted in FIGS. 3A-3B increases to a higher peak value and then is quickly dampened to the steady-state value. A node voltage Vr 722 for an active Rc snubber of the type depicted in FIGS. 4A-4C is quickly dampened to the steady-state value. Active switch S3 is closed 724 immediately following the positive state change 726 of switch SL. The clamped peak value of node voltage Vr 714 is actually considerably higher than the peak values for either the passive or active snubbers, which further reduces losses in the dual-path active snubber. Active switch S3 is closed 728 after the specified delay 730 from positive state change 726. The dual-path active snubber allows node voltage Vr to rise to a higher value and ring (while clamping the peak voltage<Vrated) for a period of time. The delta V for the dual-path active snubber is less than the delta V for the known active snubber. As a result, the total power loss required to dampen Vr is considerably less than either the passive or active RC snubbers. For a given case, the relative power losses are strongly dependent on the circuit topology, resonant network, load and forcing function. That said, one might expect the power losses of the dual-path active snubber to be one-quarter to one-third of the power losses of the active snubber.

For purposes of example, lets walk through a cycle of the forcing function and the response of the dual-path active snubber. Assume the circuit is in a negative state (S1 OPEN, S2 CLOSED, S3 OPEN) and has reached steady-state state where node voltage Vr is at ground potential of 0 volts. The voltage VCsnub is at Vg. The voltage at the junction of Csnub, Rsnub and Dsnub is −Vg.

OPEN S2, CLOSE S1 to produce a positive state change in the forcing function. The resonant circuit of Lr and Cr starts resonating and Vr starts at 0 V and then resonates towards 2*Vg activating the clamping path when diode Dsnub is forward biased. The $1^{st}$ peak of Vr (assuming it is >Vg+Vout) is clamped. Additional peaks may or may not be clamped depending on the forcing function, Vclamp and the natural dampening of node voltage Vr.

After a delay CLOSE S3 activating the damping path to draw reset current through Csnub and Rsnub to dampen node voltage Vr to equal Vg. The damping path draws all of the additional charge put on Csnub by the clamping path and dissipates it in Rsnub. The VRsnub is the difference between Vr (now Vg) and VCsnub, which is zero at steady-state. That "delta" is less than a corresponding delta for the known active snubber and represents the power losses. At steady-stage, Vr=Vg, VCsnub=Vg, VRsnub=0 and the reset current is zero and S3 is OPEN.

At the next negative state change of the forcing function, CLOSE S2 and OPEN S1 (S3 remains open) driving Vr to ground potential of 0 voltage. VCsnub remains charged at +Vg. At the next positive state change, the process repeats.

Figure 8A:
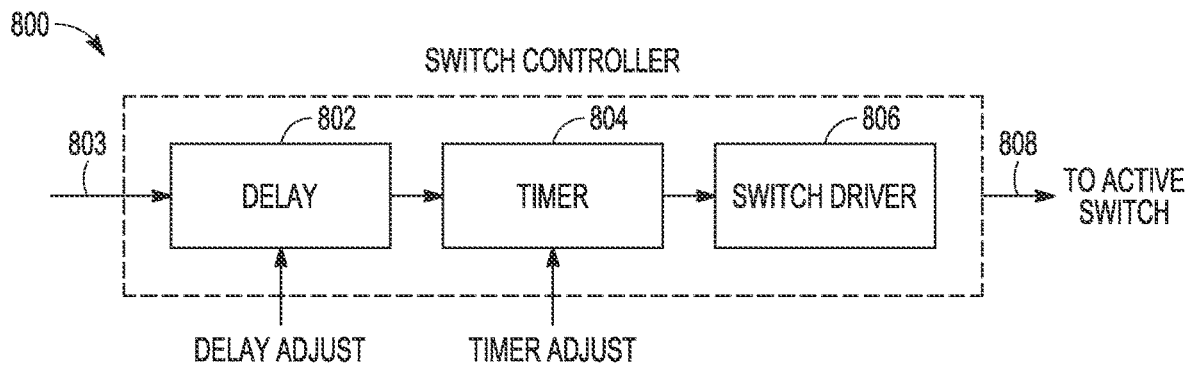
FIGS. 8A and 8B are block and timing diagrams of a switch controller to control the delay and on-time of the active switch.
Figure 8B:
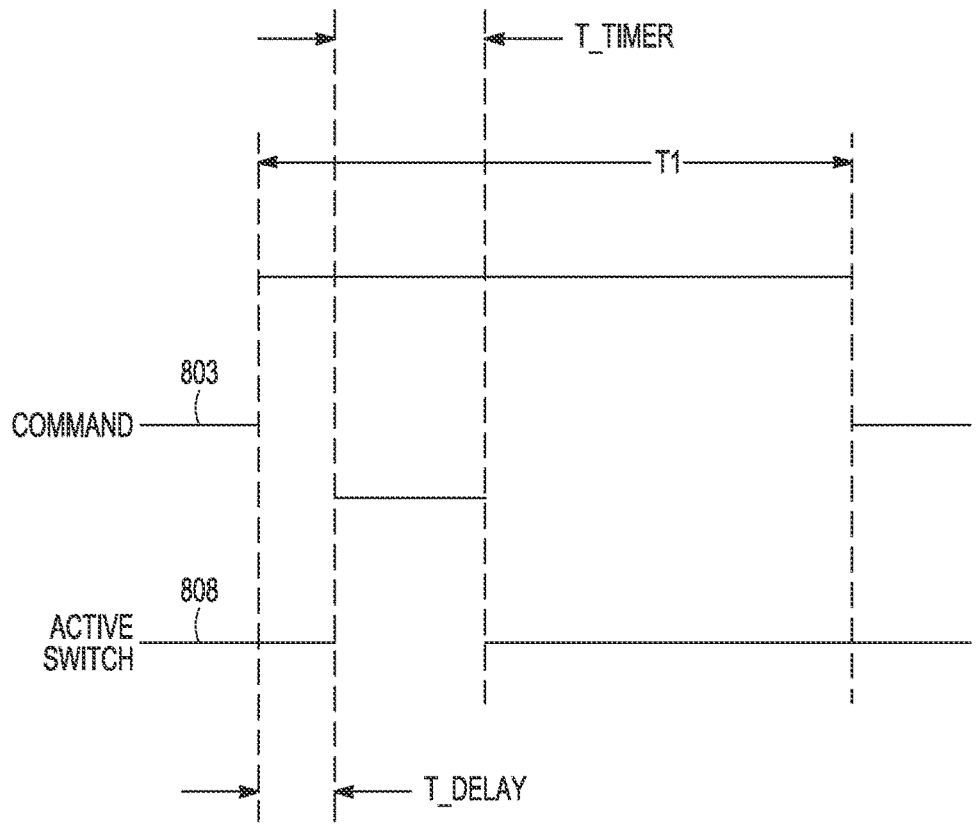

Referring now to FIGS. 8A and 8B, an embodiment of a switch controller 800 includes a delay 802 that receives a positive state change command 803, a timer 804 and a switch driver 806 that generates a command 806 to drive the active switch in the dual-path active snubber. The positive state change command 803 is the active input for the switch controller based on a positive state change of the forcing function (e.g., SPC). The command may be a function of a clocking signal that drives the forcing function or of the rising edge of the node voltage Vr.

T1 equals the time of the command signal.

T_delay is the time offset from the command signal and is a function of the delay adjust.

Delay Adjust controls the amount of delay may be a function of the operating point of the converter (i.e. input voltage, output voltage, output power).

T_timer is the time that the active switch is commanded on and is a function of Timer Adjust.

Timer Adjust controls on time of the active switch and may be a function of the operating point of the converter (i.e. input voltage, output voltage, output power).

T_timer may be less than T1 or greater than T1 based on the operating point of the converter (i.e. input voltage, output voltage, output power).

Whether fixed or variable, T_delay and T_timer are set to reduce, or minimize, power losses to dampening.

Figure 9:
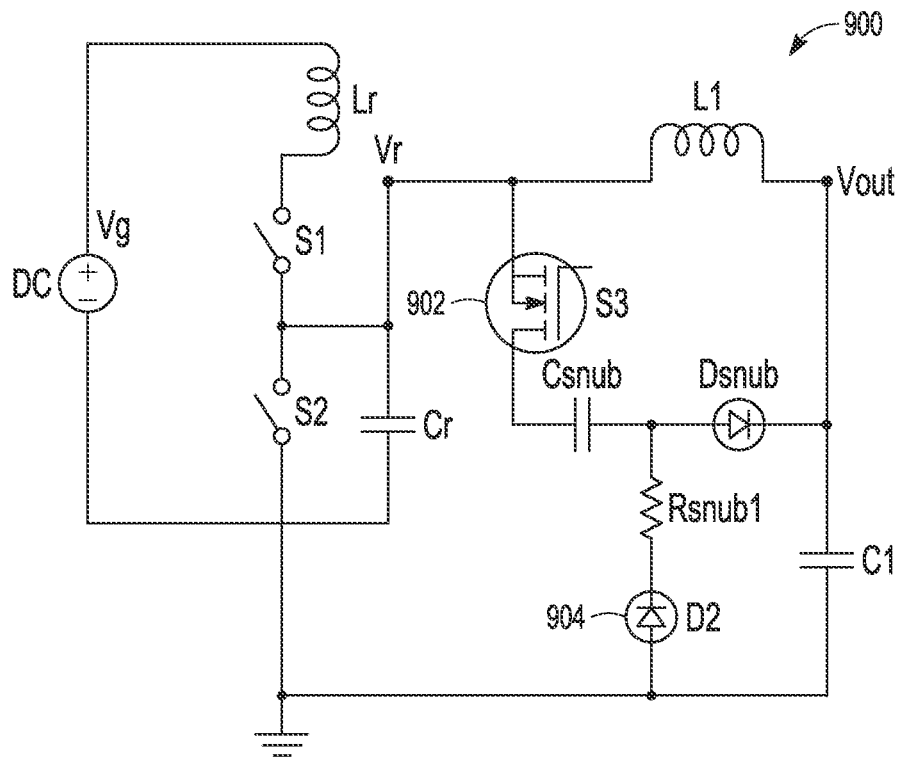
FIGS. 9 and 10 are embodiments of the Buck converter with a dual-path active damper illustrating different implementations of the active switch.
Figure 10:
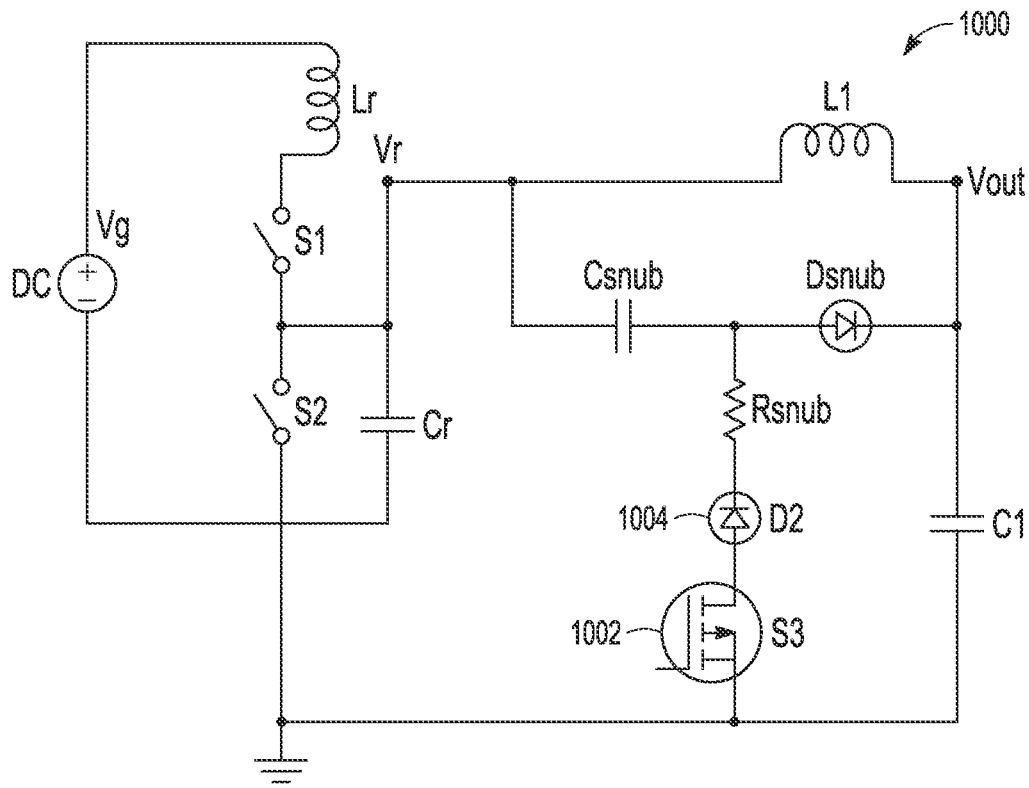

The dual-path active damper can be implemented with the active switch in the reset path or the clamp path and with non-ideal switches such as MOSFETs or GaN FETs that have intrinsic anti-parallel conduction elements. As shown in FIG. 9, in a dampened Buck converter 900, active switch S3 of the dual-path active damper is implemented with a N channel MOSFET or GaN switch 902 that is in both the clamping and damping paths and utilizes the anti parallel intrinsic body diode of the N channel MOSFET or the reverse channel conduction mode of the GaN FET to provide clamping path connectivity when S3 is off. The damping path requires a blocking diode D2 904 to prevent clamping current from flowing through Rsnub during the clamping interval. Diode D2 limits damping to negative excursions of node voltage Vr. As shown in FIG. 10, in a dampened Buck converter 1000 active switch S3 is implemented with a P Channel MOSFET 1002 placed in only the damping path. Due to the anti-parallel body diode polarity of the P Channel device D2 1004 prevents clamping current from flowing in Rsnub during the clamping interval. D2 is required for proper operation of the clamping path and also limits damping to negative excursions of node voltage Vr below Vg. This increases the amount of on-time required to dampen Vr but reduces losses.

In both embodiments, a MOSFET or a GaN switch may be selected that has an on-state resistance (Rds_on) that serves as Rsnub. Thus Rsnub is incorporated into the active switch. More generally, Rsnub may be a discrete resistive element or an on-state resistance of the active switch.

The Dual Path Active Damper was illustrated on a Buck Converter as an example and for comparison the known passive and active snubbers. It can be applied to clamp and damp any resonant network.

Figure 11A:
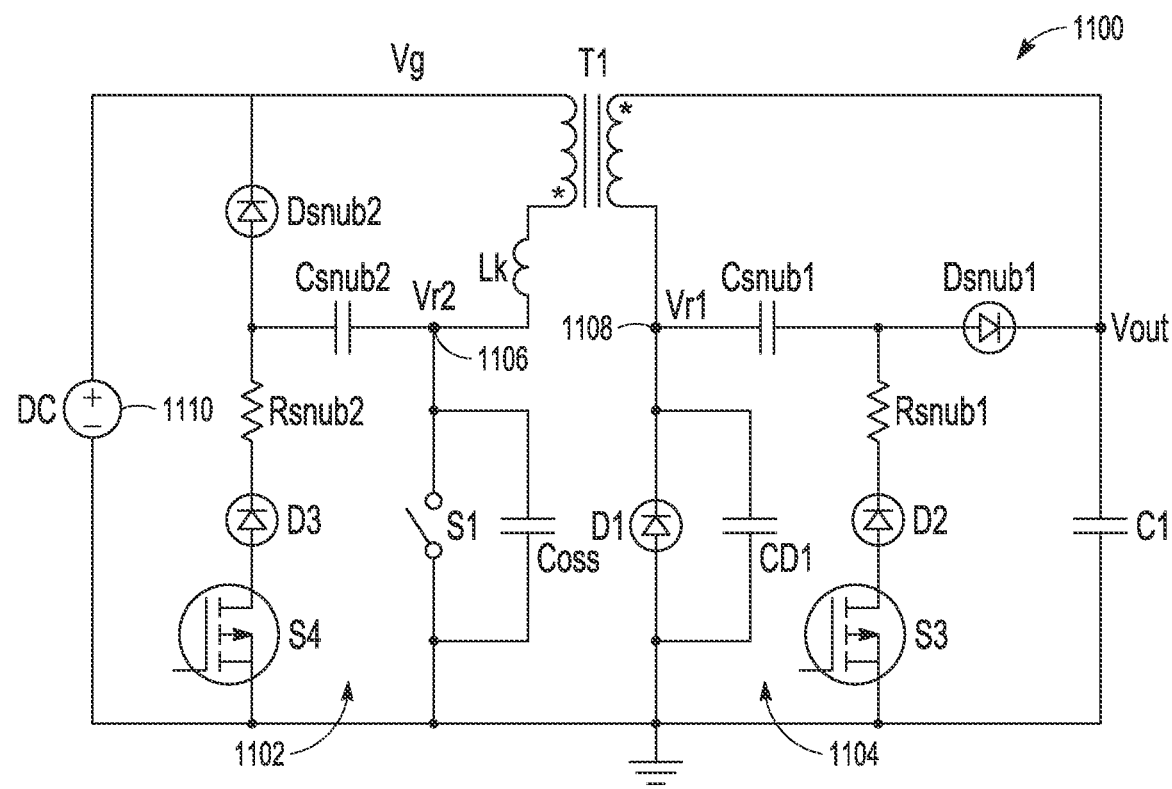
FIGS. 11A and 11B illustrate an embodiment of a Flyback converter with a dual-path active damper that immediately clamps the peak node voltage and allows the node voltage to ring before damping to minimize power loss.

As shown in FIG. 11A, a Flyback converter 1100 is provided with a pair of dual-path active damper 1102 and 1104 as implemented in FIG. 10 at node 1106 at the top of primary switch S1 and node 1108 at the top of the output rectifier D1. Alternately, damping could be provided on just the primary or just the secondary. Flyback converter 1100 includes a DC voltage source 1110, a transformer T1, primary switch S1, rectifier D1 and output capacitor C1. A primary resonant network includes leakage inductance Lk of the transformer T1 and the output capacitance (Coss) of switch S1. A secondary resonant network includes leakage inductance Lk (reflected through transformer T1) and rectifier parasitic capacitance CD1.

For the primary, dual-path active damper 1102 includes a common snubber capacitor Csnub2, a clamping path including Csnub2, a diode Dsnub2 and a clamp voltage shown as Vg (could be any other voltage but Vg is convenient and it recycles energy back to Vg) and a damping path including Csnub2, Rsnub2, active switch S4 (P Channel MOSFET) and a diode D3, which is required for proper operation of the clamping path with the P channel MOSFET and limits damping to negative excursions of Vr2 at node 1106. The clamp on the primary of a flyback is particularly interesting for flyback converters operating with a passive rectifier (or an active rectifier emulating a diode) as it provides an active clamping function that allows the magnetizing current of the transformer to stay in the $1^{st}$ quadrant. This has benefits for reducing power by keeping the converter in a forced discontinuous mode which is not possible with the prior art active clamp.

For the secondary, dual-path active damper 1104 includes a common snubber capacitor Csnub1, a clamping path including Csnub1, a diode Dsnub1 and a clamp voltage shown as Vout (could be any other voltage but again it's convenient) and a damping path including Csnub1, Rsnub1, active switch S3 (P Channel MOSFET) and a diode D2, which is required for proper operation of the clamping path with the P channel MOSFET and limits damping to negative excursions of Vr1 at node 1108.

In the flyback converter, when switch S1 is closed, transformer T1 acts like a coupled inductor to apply voltage Vg+Vout (assuming unity turns ratio across T1) across rectifier D1. This stores energy in in the airgap and magnetizing inductance of transformer T1. Vout is supported by the voltage on output capacitor C1. When switch S1 is opened, rectifier diode D1 conducts current to transfer energy stored in transformer T1 and deliver current to output capacitor C1 to support Vout and to restore the charge used in the previously half-cycle to support Vout.

Figure 11B:
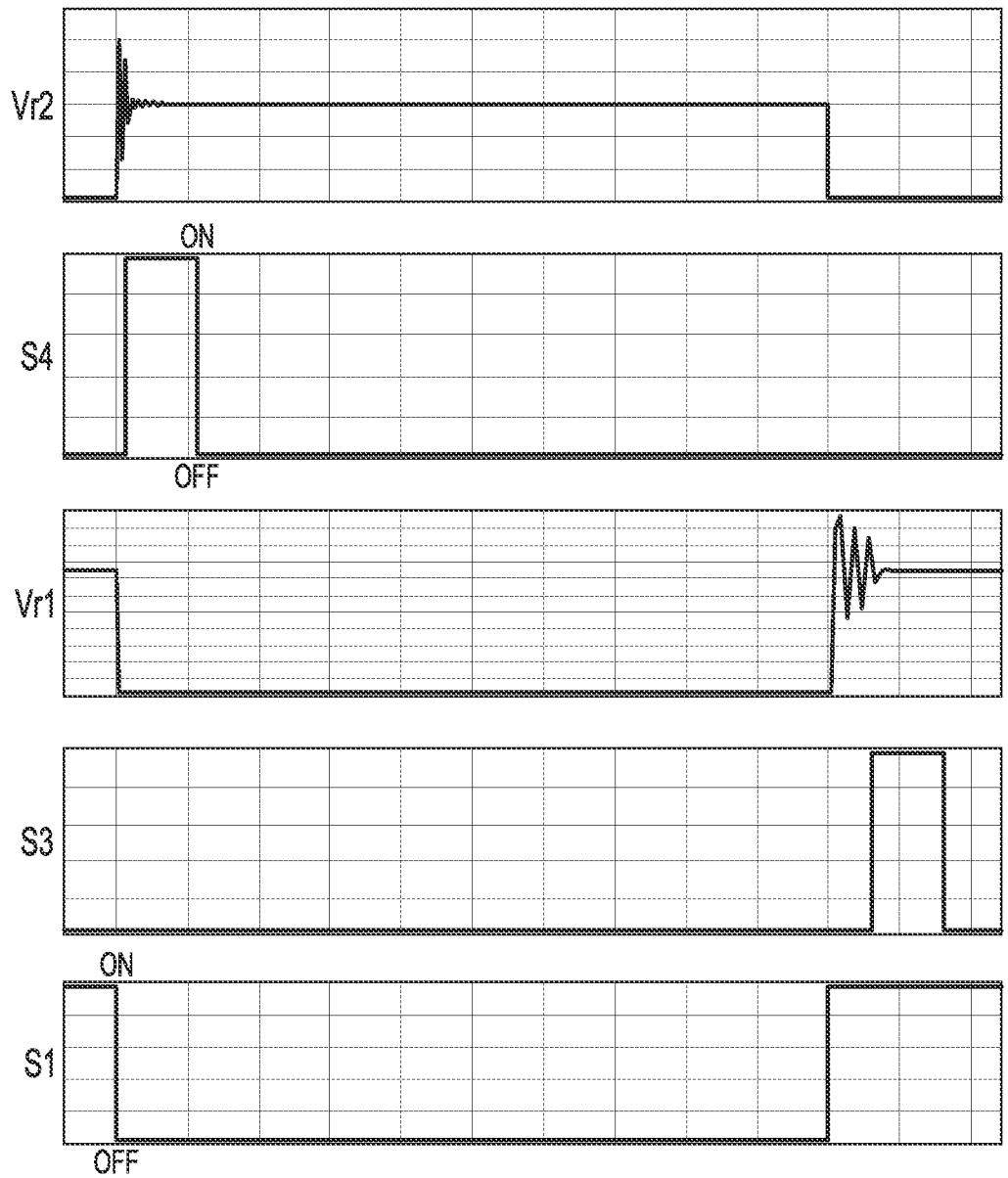

As shown in FIG. 11B, when S1 switches HIGH (ON or CLOSED) to charge transformer T1, voltage Vg is imposed across transformer T1 causing the secondary resonant circuit of Lk and CD1 to resonate and node voltage Vr1 to ring. Dual-path active damper 1104 clamps Vr1 and after a delay switches S3 HIGH to dampen Vr1. When S1 switches LOW (OFF or OPEN) to discharge T1, the primary resonant network of Lk and Coss resonates and node voltage Vr2 rings. Dual-path active damper 1102 clamps Vr2 and after a delay switches S4 HIGH to dampen Vr2

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A dual-path active damper for a resonant network in which a forcing function Vs produces a node voltage Vr for a device that rings about a steady-state value Vss at each positive state change of the forcing function, said dual-path active damper comprising:
    a snubber capacitor Csnub coupled to the node;
    a clamping path including a clamp voltage Vclamp in series with Csnub, said clamping path conducting a clamp current Iclamp at only each positive state change to flow through Csnub and Vclamp to clamp a peak value of node voltage Vr at Vss+Vclamp, wherein node voltage Vr is allowed to ring and dampen naturally to store energy on Csnub for a set interval after the positive state change that extends beyond the clamping of the peak value; and
    a damping path including a snubber resistance and an active switch in series with Csnub, wherein at the expiration of the set interval, said active switch closes such that the flow of Iclamp is suspended and the damping path conducts a reset current Ireset through the Csnub, the snubber resistance and the active switch in a direction opposite that of Iclamp to dampen the ringing of node voltage Vr and reset the energy in Csnub.

2. The dual-path active damper of claim 1, wherein a switched power supply (SPC) supplies the forcing function and the device is a switch in the SPC.

3. The dual-path active damper of claim 1, wherein the clamping path further includes a diode in series with Csnub and Vclamp, wherein at each positive state change, node voltage Vr increases from the steady-state value Vss until surpassing Vr+Vclamp at which point the diode conducts Iclamp to clamp the peak voltage of node voltage Vr at Vss+Vclamp.

4. The dual-path active damper of claim 1, wherein the device has a rated voltage Vrated, wherein Vss+Vclamp<Vrated.

5. The dual-path active damper of claim 1, wherein the set interval and an on-time of the active switch are set to reduce the charge stored in Csnub to reduce damping losses subject to node voltage Vr reaching the steady-state value Vss within a specified period from each positive state change.

6. A dual-path active damper for a resonant network in which a forcing function Vs produces a node voltage Vr for a device that rings about a steady-state value Vss at each positive state change of the forcing function, said dual-path active damper comprising:
    a snubber capacitor Csnub coupled to the node;
    a clamping path including a clamp voltage Vclamp in series with Csnub, said clamping path conducting a clamp current Iclamp at only each positive state change to flow through Csnub and Vclamp to clamp a peak value of node voltage Vr at Vss+Vclamp, wherein node voltage Vr is allowed to ring and dampen naturally to store energy on Csnub for a set interval after the positive state change that extends beyond the clamping of the peak value; and
    a damping path including a diode, a snubber resistance Rsnub and an active switch in series with Csnub, wherein at the expiration of the set interval, said active switch closes such that the flow of Iclamp is suspended and the damping path conducts a reset current Ireset through series-connected Csnub Rsnub and the active switch Ma direction opposite that of Iclamp to dampen the ringing of node voltage Vr and reset the energy in Csnub, wherein the damping path conducts the reset current Ireset through series-connected Csnub and Rsnub and diode only on negative excursions of node voltage Vr with respect to Vss to dampen the ringing of node voltage Vr.

7. A dual-path active damper for a resonant network in which a forcing function Vs produces a node voltage Vr for a device that rings about a steady-state value Vss at each positive state change of the forcing function, said dual-path active damper comprising:
    a snubber capacitor Csnub coupled to the node;
    a clamping path including a clamp voltage Vclamp in series with Csnub, said clamping path conducting a clamp current Iclamp at only each positive state change flow through Csnub and Vclamp to to clamp a peak value of node voltage Vr at Vss+Vclamp, wherein node voltage Vr is allowed to ring and dampen naturally to store energy on Csnub for a set interval after the positive state change that extends beyond the clamping of the peak value; and
    a damping path including a snubber resistance Rsnub and an active switch in series Csnub, wherein at the expiration of the set interval, said active switch closes such that the flow of Iclamp is suspended and the damping path conducts a reset current Ireset through series-connected Csnub and Rsnub in a direction opposite than of Iclamp to dampen the ringing of node voltage Vr to a reset value of node voltage Vr at Vss and reset the energy in Csnub.

8. The dual-path active damper of claim 1, wherein the active switch remains closed for at least a minimum reset period of the series-connected Csnub and Rsnub.

9. The dual-path active damper of claim 8, wherein the active switch opens prior to the next negative state change of the forcing function.

10. The dual-path active damper of claim 8, wherein the active switch remains closed to overlap the next negative state change of the forcing function.

11. The dual-path active damper of claim 6, wherein the set interval and an on-time of the active switch are set to reduce the charge stored in Csnub to reduce damping losses subject to node voltage Vr reaching the steady-state value Vss within a specified period from each positive state change.

12. The dual-path active damper of claim 11, wherein the on-time is variable and responsive to changes in the forcing function.

13. A dual-path active damper for a resonant network in which a forcing function Vs produces a node voltage Vr for a device that rings about a steady-state value Vss at each positive state change of the forcing function, said dual-path active damper comprising:
   a snubber capacitor Csnub coupled to the node;
   a clamping path including a clamp voltage Vclamp in series with coupled to Csnub, said clamping path conducting a clamp current Iclamp at only each positive state change to flow through Csnub and Vclamp to clamp a peak value of node voltage Vr at Vss+Vclamp, wherein node voltage Vr is allowed to ring and dampen naturally to store energy on Csnub for a set interval after the positive state change that extends beyond the clamping of the peak value; and
   a damping path including a snubber resistance Rsnub and an active switch in series with Csnub Csnub to form an RC snubber, wherein at the expiration of the set interval, said active switch closes for an on-time such that the flow of Iclamp is suspended and the damping path conducts a reset current Ireset through the RC snubber in a direction opposite that of Iclamp to dampen the ringing of node voltage Vr and reset the energy in Csnub, wherein the set interval and on-time are set to reduce the charge stored in Csnub to reduce damping losses subject to node voltage Vr reaching a reset value at the steady-state value Vss within a specified amount of time from each positive state change.

14. The dual-path active damper of claim 13, wherein the device has a rated voltage Vrated, wherein Vss+Vclamp<Vrated.

15. The dual-path active damper of claim 13, wherein the damping path includes a diode, wherein the damping path conducts the reset current Ireset through the RC snubber and diode only on negative excursions of node voltage Vr with respect to Vss to dampen the ringing of node voltage Vr.

16. The dual-path active damper of claim 13, wherein the on-time of the active switch is variable and responsive to changes in the forcing function.

17. A damped switching power converter (SPC), comprising:
   a SPC including an energy storage section (ESS) responsive to selective application of a DC input voltage Vin to produce a forcing function and at least switches S1 and S2 that switch in opposition to selectively apply the DC input voltage Vin;
   wherein a parasitic inductance Lpar and a parasitic capacitance Cpar of the SPC form a resonant network;
   wherein the forcing function is applied to the resonant network to generate a node voltage Vr across switch S2 that rings about a steady-state value Vss at each positive state change of the forcing function; and
   a dual-path active damper including
   a snubber capacitor Csnub coupled to the node;
   a clamping path including a clamp voltage Vclamp in series with Csnub, said clamping path conducting a clamp current Iclamp at only each positive state change to flow through Csnub and Vclamp to clamp a peak value of node voltage Vr at Vss+Vclamp, wherein node voltage Vr is allowed to ring and dampen naturally to store energy on Csnub for a set interval after the positive state change that extends beyond the clamping of the peak value; and
   a damping path including a snubber resistance Rsnub and an active switch in series with Csnub, wherein at the expiration of the set interval, said active switch closes for an on-time such that the flow of Iclamp is suspended and the damping path conducts a reset current Ireset through the RC snubber in a direction opposite that of Iclamp to dampen the ringing of node voltage V and reset the energy in Csnub.

18. The damped SPC of claim 17, wherein conduction of the reset current Ireset through the RC snubber dampens the ringing of node voltage Vr to a reset value of node voltage Vr at Vss.

19. The damped SPC of claim 17, wherein the damping path includes a diode, wherein the damping path conducts the reset current Ireset through the RC snubber and diode only on negative excursions of node voltage Vr with respect to Vss to dampen the ringing of node voltage Vr.

20. The damped SPC of claim 17, wherein the on-time of the active switch is variable and responsive to changes in the forcing function.

* * * * *

UNITED STATES PATENT AND TRADEMARK OFFICE
CERTIFICATE OF CORRECTION

| | | |
|---|---|---|
| PATENT NO. | : 11,984,799 B2 | Page 1 of 1 |
| APPLICATION NO. | : 17/572607 | |
| DATED | : May 14, 2024 | |
| INVENTOR(S) | : Perry et al. | |

It is certified that error appears in the above-identified patent and that said Letters Patent is hereby corrected as shown below:

In the Specification

In Column 6, Line 67, delete "SL." and insert --S1.-- therefor

In the Claims

In Column 10, Line 37, in Claim 6, delete "Ma" and insert --in a-- therefor

Signed and Sealed this
Twenty-eighth Day of January, 2025

Coke Morgan Stewart
*Acting Director of the United States Patent and Trademark Office*